United States Patent [19]
French et al.

[11] Patent Number: 5,233,415
[45] Date of Patent: Aug. 3, 1993

[54] IMAGING LIDAR EMPLOYING TRANSMITTER REFERENCING

[75] Inventors: Melvin P. French, Barkhamsted, Conn.; R. Norris Keeler, McLean, Va.; Michael V. Finn, Silver Spring, Md.

[73] Assignee: Kaman Aerospace Corporation, Bloomfield, Conn.

[21] Appl. No.: 688,928

[22] Filed: Apr. 19, 1991

[51] Int. Cl.⁵ ............................ G01C 3/08; H04N 7/00
[52] U.S. Cl. .................................. 358/95; 356/5
[58] Field of Search .................. 358/95, 105; 250/334, 250/342

[56] References Cited

U.S. PATENT DOCUMENTS

| | | | |
|---|---|---|---|
| 4,195,221 | 3/1980 | Moran | 358/95 |
| 4,195,311 | 3/1980 | Moran | 358/95 |
| 4,302,673 | 11/1981 | Bly | 250/342 |
| 4,862,257 | 8/1989 | Ulich | 358/95 |
| 5,006,813 | 4/1991 | Khoshnevisan | 356/5 |

Primary Examiner—Stephen C. Buczinski
Attorney, Agent, or Firm—Fishman, Dionne & Cantor

[57] ABSTRACT

An imaging lidar system is presented which utilizes internal or external transmitter beam pattern referencing for improved imaging lidar performance. In general, the present invention samples the laser output at or near the source to obtain a reference of the signal intensity distribution. This reference signal includes any anomalous spatial intensity distributions (associated with the output of the laser transmitter) which can then be discounted or subtracted out from the signals received from the target area of interest.

31 Claims, 3 Drawing Sheets

IMAGING LIDAR EMPLOYING TRANSMITTER REFERENCING

BACKGROUND OF THE INVENTION

This invention relates generally to a sensor system for remote detection and imaging of objects in a backscattering medium such as air or water. More particularly, this invention relates to a method and apparatus for detecting, locating and/or imaging underwater objects such as mines and submarines from an airborne platform using a novel imaging lidar (light detection and ranging) system which improves imaging though the use of internal or external transmitter referencing.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging.

An improved and novel system for remote detection and imaging of objects underwater (or objects obscured by other backscattering media which is at least partially transmitting to light such as ice, snow, fog, dust and smoke) from an airborne platform has been described in U.S. Pat. Nos. 4,862,257 and 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging lidar system intended for night vision.

Imaging lidar systems of the type described hereinabove are also disclosed in commonly assigned U.S. Pat. Nos. 4,964,721, and 4,967,270, both of which are incorporated herein by reference. U.S. Pat. No. 4,964,721 relates to an imaging lidar system which controls camera gating based on input from the aircraft onboard altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

U.S. Ser. No. 565,631 filed Aug. 10, 1990 which is also assigned to the assignee hereof and fully incorporated herein by reference, relates to an airborne imaging lidar system which employs a plurality of pulsed laser transmitters, a plurality of gated and intensified array camera receivers, an optical scanner for increased field of regard, and a computer for system control, automatic target detection and display generation. U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

While the imaging lidar systems described above are well suited for their intended purposes, there continues to be a need for imaging lidar systems of this type which have improved operational accuracy and efficiency in the imaging of targets enveloped by a backscattering medium, particularly underwater targets. One significant problem with known imaging lidar systems is that the performance of these devices are dependent, in part, on the quality of the laser transmitter's output (e.g., the spatial intensity distribution of the laser output). Any anomalous intensity distributions in the laser spatial intensity distribution at the laser output has a deleterious effect on the gated images viewed from the backscattered light reflected off the target. As a result, prior art imaging lidar systems have employed complex and complicated schemes in an attempt to insure that the laser output has uniform spatial intensity distribution (e.g., lacks any anomalies). Such steps have included, for example, (1) precise alignment of optical components in the laser; (2) maintaining cleanliness; (3) use of channel integrators; (4) radiation projecting devices; (5) use of computer software processing (e.g., filtering) techniques.

In practically all implementations of known imaging lidar systems, the alignment (and maintenance of the alignment) of the various components within the laser transmitter has become the primary contributing factor in demonstration of suboptimal performance in test and evaluation scenarios. These problems have manifested themselves in the form of anomalous signals received from the target area which impede or destroy the ability of the operator to detect targets. As mentioned above, because of the anomalies associated with the laser transmitter, presently known lidar systems require the incorporation of sophisticated automatic target detection algorithms (for identifying actual targets as opposed to anomalies or noise) which in turn, increase requirements for ever expanding computer power. At the same time, efforts have been expended to incorporate radiation projecting hardware to improve the quality of the transmitted beam. Since these devices add to system weight and add a loss component to the output, they are less desirable than other approaches from the standpoint of maximizing signal on target. Unfortunately, none of these steps provide a comprehensive solution to the problem of ensuring uniform spatial intensity distribution; and anomalous transmitted signals are typically still present in the laser output.

SUMMARY OF THE INVENTION

The above-discussed and other drawbacks and deficiencies of the prior art are overcome or alleviated by the imaging lidar system of this invention which utilizes internal or external transmitter referencing for improved imaging lidar performance. In general, the present invention samples the laser output at or near the source to obtain a reference of the signal intensity distribution. This reference signal includes any anomalous spatial intensity distributions (associated with the output of the laser transmitter) which can then be discounted or subtracted out from the signals received from the target area of interest.

The present invention includes several embodiments which may be categorized as either software or hardware internal implementation and software or hardware external implementation. In a first embodiment (the software internal implementation), a reflective "pick-off" in the transmitter's exit aperture is utilized. The reflective energy will, of course, include any anomalous signal intensity distributions. The reflected energy (e.g., 1%) obtained by the "pick-off" is then projected onto a video chip (e.g., CCD array) of identical scale (i.e. the same number and orientation of pixels). The signal recorded by this CCD array is used as the reference point for comparing to the signal recorded by the receiver (from the target area). The two signals are scaled to a common mean value and then subtracted so that any anomalies in the laser transmitter are removed. A second embodiment (the hardware internal implementation) is essentially the same as the software internal embodiment, except that this second embodiment utilizes a hardware filter to compare the two image planes and output an appropriately "clean" data set.

A third embodiment (the software external implementation) employs an external reference signal determined from backscatter from the medium preceding the target area. As in the previously discussed embodiments, this reference signal will include any anomalies from the spatial intensity distribution of the laser transmitter. A receiver associated with the imaging lidar system is then gated to record and store this reference image which is scaled and then subtracted from the reflected target image thereby cancelling out any anomalous signals. The fourth embodiment of this invention employs a software implementation of the third embodiment.

While prior art imaging lidar systems are primarily concerned with the return images from the target (which are highly laser output dependent and include any anomalous signal intensity distributions), the present invention is concerned with the laser output before it hits the target area and compares (or subtracts) that laser output spatial intensity distribution to the spatial intensity distribution returned from the target area, thereby effectively eliminating or minimizing any adverse impact by these signal anomalies. Therefore, in situations where the human operator is the primary or only target detector, the confusion between "real" and "transmitted" anomalous target returns is eliminated providing clean presentations of data to the operator. In cases where software/firmware automatic target detection programs (ATD) are used, the ATD may be considerably simplified by providing data which discounts transmitted anomalies. For example, a mean ormedian filter may not be required for each frame of data. In this case, data throughput requirements may be greatly reduced in certain implementations.

The above-described and other features and advantages of the present invention will be appreciated and understood by those of ordinary skill in the art from the following detailed description and drawings.

BRIEF DESCRIPTION OF THE DRAWINGS

Referring now to the drawings wherein like elements are number alike in the several FIGURES.

DESCRIPTION OF THE PREFERRED EMBODIMENT

In accordance with the present invention, anomalous signals in the spatial intensity distribution output by a laser transmitter of an imaging lidar system are minimized and/or completely reduced by use of internal or external transmitter referencing schemes. Such referencing allows for the discounting or subtraction of anomalous signal intensity distributions from the signals received from the target area of interest.

Figure 1:
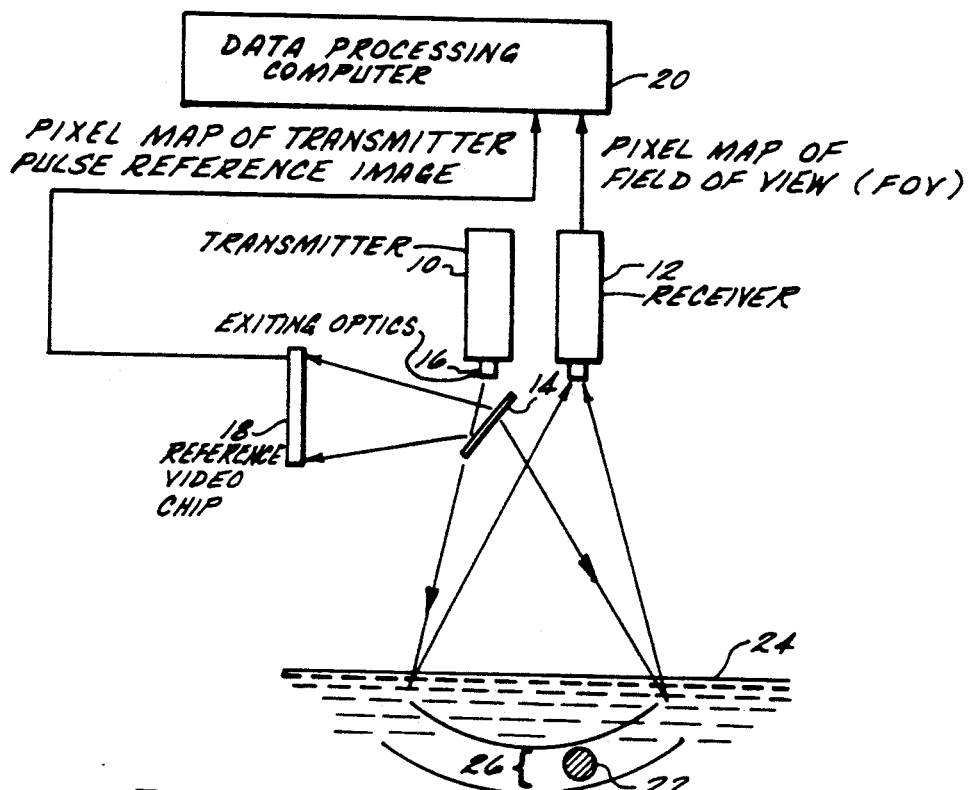
FIG. 1 is a schematic view of an imaging lidar system in accordance with a first embodiment of the present invention.

In a first embodiment of the present invention depicted in FIG. 1, an imaging lidar system such as the type described in U.S. Pat. No. 4,862,257 or U.S. application Ser. No. 565,631 is shown diagramatically by transmitter 10 and receiver 12. A small portion of the laser output from transmitter 10 is sampled and used as a reference with respect to the images received by receiver 12. This is accomplished by use of a reflective pick-off 14 which is placed in the field of the exit optic 16 of transmitter 10. Pick-off 14 diverts a small amount of energy (e.g., 1%) towards a reference video chip 18. Video chip 18 views an entire cross-section of the laser beam exiting laser optic 16 and comprises a CCD array having the same pixel dimension size as the CCD array associated with receiver 12. The output from reference video chip 18 will thus comprise a pixel map of the transmitted pulse and will act as a reference image which will include any anomalous signal intensity distributions. This reference signal is transmitted to and stored by a data processing computer 20. In accordance with well known operating procedure of emitting lidar systems, a target 22 (which is shown below the surface of a body of water 24) is imaged by gated receiver 12. In fact, gated receiver 12 actually images a slice or volume of water 26 which includes target 22. This target image 26 actually constitutes a pixel map of the field of view (FOV) and will again include any anomalous signal intensity distributions which were associated with the original transmitted laser beam. The pixel map of the FOV is also sent to and stored by data processing computer 20. Because the reference video chip 18 comprises a CCD array which exactly matches the CCD array in receiver 12, the pixel map of the reference image can be compared to the pixel map of the field of view and discounted or subtracted. As a result, the common features (including the anomalous signal intensity distributions) of the two pixel maps will be removed from the combined pixel map resulting in a sharper, more highly defined and less error prone image of the field of view and the target 22. The embodiment depicted at FIG. 1 is known as a software internal implementation of the present invention.

Figure 2:
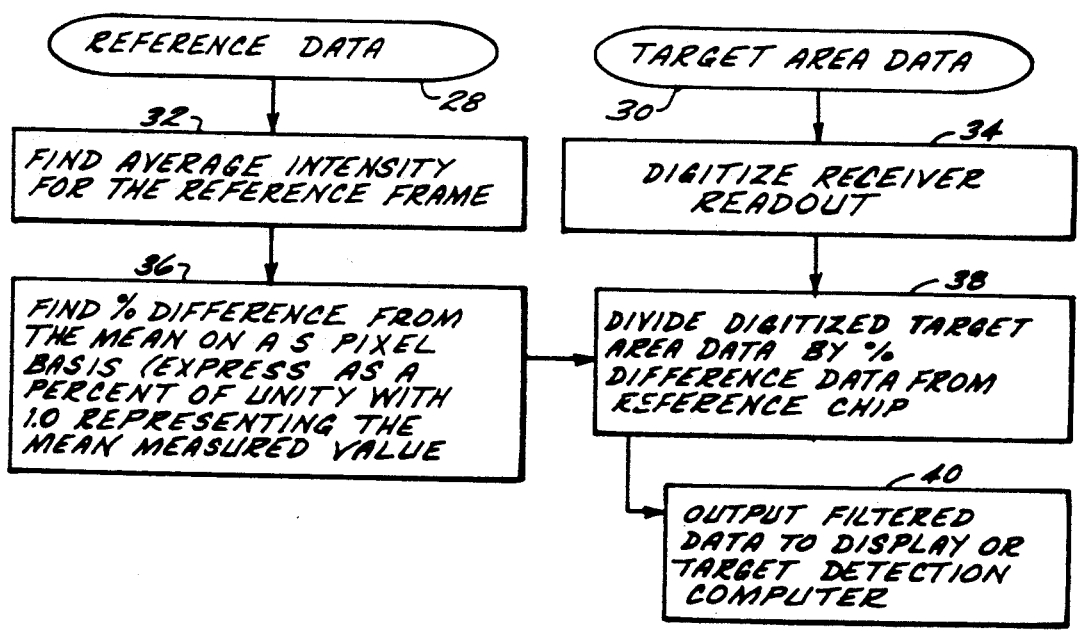
FIG. 2 is a block diagram of a second embodiment in accordance with the present invention.

With reference to FIG. 2, a flow chart is shown of a variation of the FIG. 1 embodiment which uses the same schematic set-up (which includes the reference video chip 18 used to alter receiver data prior to output to the display or target detection computer). However, unlike the FIG. 1 embodiment wherein a simple subtraction of the two pixel maps is made, in accordance with the FIG. 2 embodiment, the following sequence occurs. First, the reference data is acquired as before (item 28) as is the target area data (item 30). Next, the average intensity for each reference frame is determined (see item 32). Meanwhile, the target area data is digitized (see item 34). Next, the percent difference from the mean (also termed contribution margin) on an "as pixel" basis (expressed as a percent of unity with 1.0 representing the mean measured value) for each of the averaged referenced frames is determined at item 36. The digitized target area data is then divided by the percent difference data from the reference chip at 38 to define output filtered data 40. The output filter data is then sent directly to a display or may be sent to a target detection computer wherein the data is analyzed in accordance with certain target detection programming such as is described in U.S. patent application Ser. Nos. 565,425 and 565,424, both of which were filed on Aug. 10, 1990, assigned to the assignee hereof and incorporated herein by reference.

Figure 3:
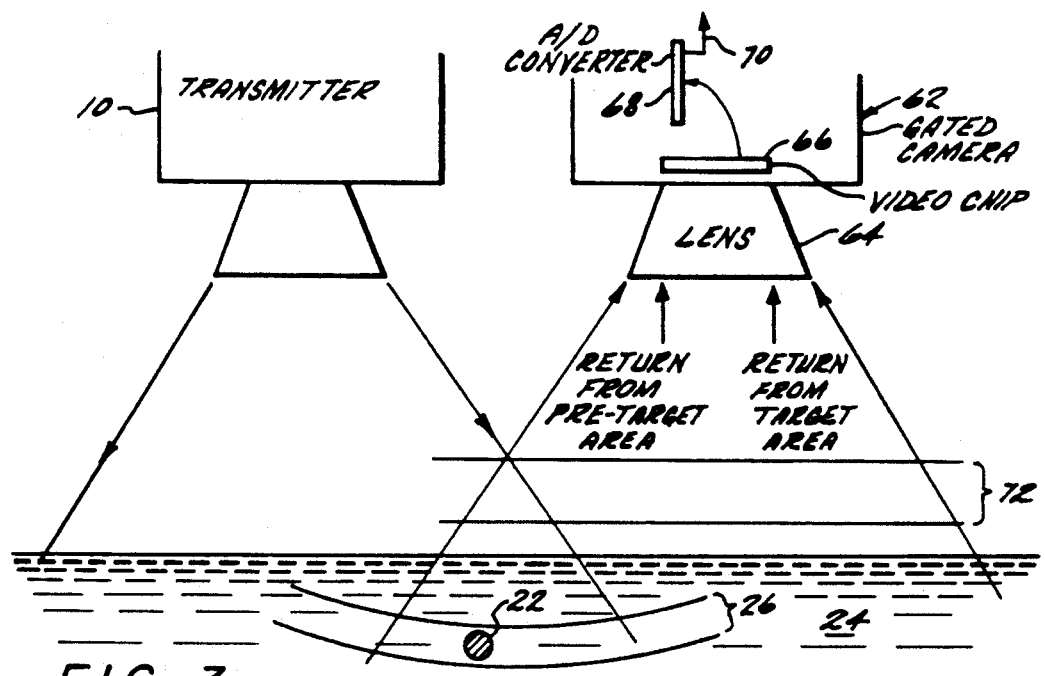
FIG. 3 is schematic view of a receiving unit in accordance with still another embodiment of the present invention.

In accordance with still another embodiment of the present invention, an external reference is utilized which involves the imaging of the return signal from the medium (e.g., water) between the receiver and the target for use as a reference. Referring now to FIG. 3, this external implementation of the transmitter referencing scheme of the present invention is shown. In FIG. 3, a diagramatic view of a gated receiving camera is shown at 62. Camera 62 includes a lens 64 which communicates with a video chip 66 of the type depicted at 18 in FIG. 1. Video chip 66 communicates with an analog to digital converter 68 which may be hardwired with a statistical filter algorithm (shown by the block diagram of FIG. 4). A filter signal is delivered by line 70 to a computer for further processing and eventually to a storage or display unit. In accordance with the FIG. 3 embodiment, a laser transmitter (such as 10 in FIG. 1) emits a laser pulse. Thereafter, gated camera 62 initially receives an image of light returned (e.g., backscatter) from a pre-target area (identified at 72) with the image appearing on CCD array 66. It will be appreciated that the reference image of the pre-target area will include any anomalous signals associated with the spatial intensity distribution of the laser output. This pre-target image is designated the reference image and transferred to and stored on hardware 68. Next, camera 62 is again gated at a time corresponding to volume 26 thereby encompassing target 22. This return from the target area 26 again is imaged on CCD array 66 and stored in hardware 68. The reference and target images stored in hardware 68 are then compared (e.g., subtracted) so that the pre-target signal and target area signal are combined to obtain a filtered signal. Note that scaling of the two images may be needed prior to comparing (or subtracting). As in the FIG. 1 embodiment, the filtered signal derived from the FIG. 3 embodiment will have removed any anomalous signal intensity distributions to provide a cleaner, and improved signal which may be viewed by the operator or sent on to an automatic target detection program.

Figure 5:
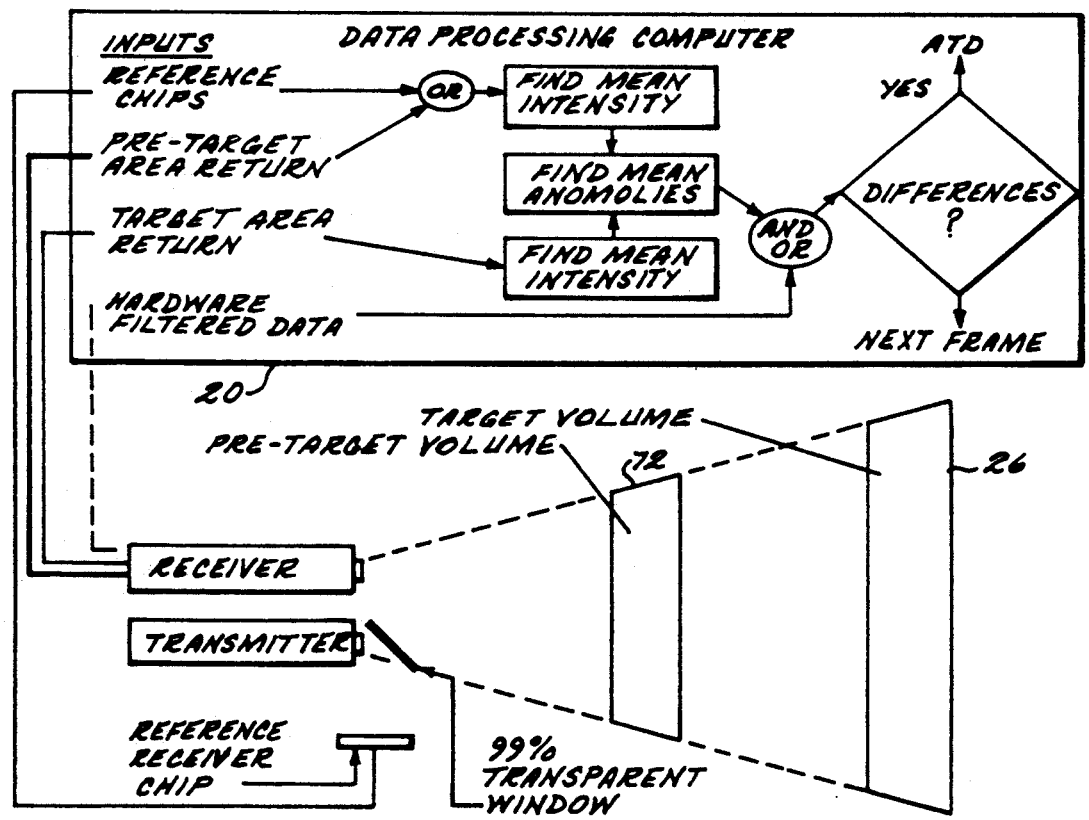
FIG. 5 is a diagramatic view combining all of the features from the embodiments of FIGS. 1, 2 and 3.
Figure 4:
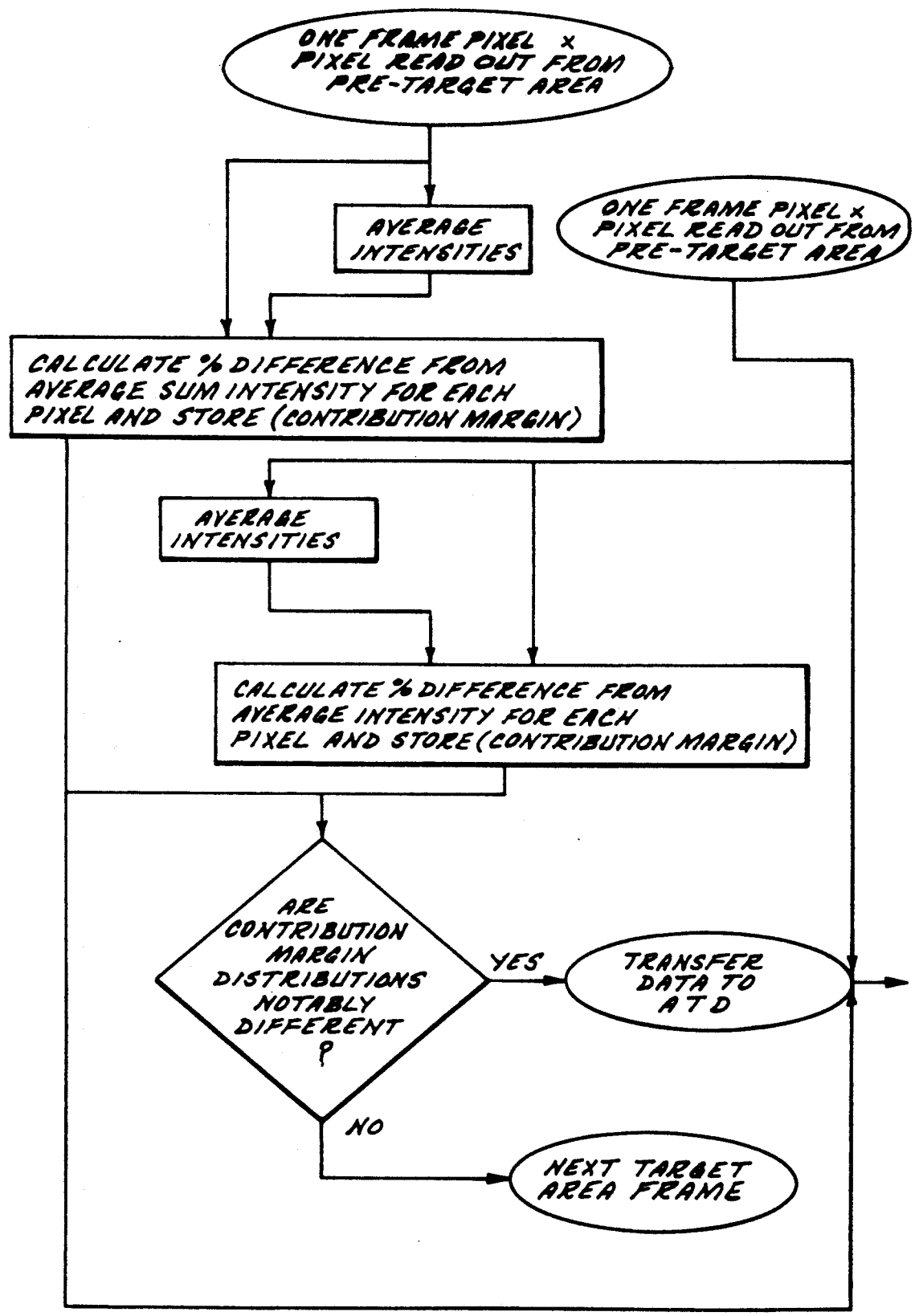
FIG. 4 is a flow chart for use in conjunction with the receiving unit of FIG. 3.

The hardware component 68 depicted in FIG. 4 is described in more detail on the block diagram of FIG. 5. FIG. 5 will be readily understood by one of ordinary skill in the art. It will be appreciated that the average intensities are used on a pixel-by-pixel basis for reading out the images from both the pre-target area as well as from the target area. Also, the percent difference is calculated from the average sum intensity for each pixel and stored with regard to both the pre-target and target area. This step defines a contribution margin. For example, a pixel having an intensity of 12% above the mean would have a contribution margin of 1.12, while a pixel having an intensity of 32% below the mean would have a margin of 0.68. If the contribution margin distributions are notably different, then the particular pixel data probably represents the target (as opposed to anomalous signal intensity distributions) and so this information is transferred to the visual screen or the automatic target detection program. However, if the contribution margin distribution are not notably different, then this data is probably due to anomalous signals and is discounted as probably not containing a target image.

It will be appreciated that the FIG. 4 embodiment may be implemented using a single camera or a multiple camera such as described in U.S. Pat. No. 4,967,270. In a multicamera scheme, one camera could be used for imaging the pre-target return while a second camera could be used for imaging the target area returned.

With reference to FIG. 5, a schematic is shown wherein all of the several embodiments described hereinabove are combined in a single schematic. Thus, item 74 indicates the embodiment of FIG. 1 wherein a reference receiver chip is used to reference the laser output from transmitter 10. Item 76 represents the data filter of FIG. 2 while item 78 indicates the pre-target area of referencing scheme of FIGS. 3 and 4.

The present invention provides marked improvement in the performance of imaging lidar systems of the type hereinabove discussed. The present invention also reduces or eliminates the need for homogenizer gear and thus increases the signal strength received from the target, reduces the tuning requirements, reduces the need for system hardening to facilitate retention of transmitted beam homogenization, provides a diagnostic tool for transmitter trouble shooting and reduces the work load on the associated automatic target detection programming (by pre-screening transmitter anomalies out of received signals from the target area). The present invention can also assist in characterizing the quality of the transmitter output. Also, the present invention reduces the requirement for frame-by-frame low pass filtering. Indeed, the latter three improvements of the present invention lead to a dramatic reduction in the computer processing requirements for an imaging lidar system of this type. In still another feature, this invention can be used for discounting the effects of a medium interface, such as ocean surface roughness.

In short, the presently known imaging lidar systems emphasize the provision of pristine transmitted intensity distributions to the target area (which itself is unrealistic in cases in where a medium interface is involved) and then uses sophisticated (and costly) automatic detection algorithms to pull out "real" from transmitted signals. While quality of the transmitted beam may be desirable for other reasons (such as assuring conversion efficiency), it is not necessary for successful implementation of the automatic detection algorithms. Implementation of the present invention allows the utilization of a primary piece of data (namely quality of the projected beam) for the simplification of the system operation and data analysis reduction in a real time environment.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for detecting and imaging a target volume enveloped by backscattering medium which is at least partially transmitting to light comprising the steps of:
   selectively generating short pulses of light using transmitter means;
   projecting said short pulses of light toward the backscattering medium and at a target volume enveloped by the medium;
   receiving said pulses of light reflected back from said target volume after a time delay corresponding to the round-trip propagation time of said light pulses to and from said target volume using receiver means;
   converting said received pulses of light to a video image of said target defining a target volume image;
   obtaining a reference image of said short pulses of light generated by said transmitter means;
   comparing said reference image and said target volume image; and
   subtracting said reference image from said target volume image.

2. The method of claim 1 wherein the step of obtaining the reference image includes the steps of:
   sampling a portion of the entire cross-section of light output from said transmitter means; and
   converting said sampled portion to said reference image.

3. The method of claim 2 including:
   using reflective pick-off means to sample said portion of light output from said transmitter means.

4. The method of claim 2 wherein said receiver means includes first video chip means having preselected dimensions and including:
   using second video chip means to convert said sampled portion to said reference image, said second video chip means having preselected dimensions equal to said first video chip means.

5. The method of claim 4 wherein said first and second video chip means comprise CCD arrays.

6. The method of claim 1 wherein the step of obtaining the reference image includes the steps of:
   receiving pulses of light reflected back from a volume which is located between said receiver means and said target volume to define pre-target received pulses; and
   converting said pre-target received pulses to said reference image.

7. The method of claim 1 wherein said target image volume comprises a plurality of discrete target pixels and said reference image comprises a plurality of discrete reference pixels and including the steps of:
   determining the average target intensities for all target pixels;
   determining the average reference intensities for all reference pixels;
   comparing each target pixel to the average target intensities and determining a first % difference;
   comparing each reference pixel to the average reference intensities and determining a second % difference; and
   comparing the first and second differences on a pixel-by-pixel basis.

8. The method of claim 1 wherein the step of obtaining the reference image includes the steps of:
   sampling the light return from the surface of a medium interface; and
   discounting the medium interface anomalies from the target volume image.

9. The method of claim 1 wherein said target image volume comprises a plurality of discrete target pixels and said reference image comprises a plurality of discrete reference pixels and including the steps of:
   digitizing for all target pixels;
   determining the average reference intensities for all reference pixels;
   determining the percent difference from the mean on an "as pixel" basis for each of the average reference intensities thereby defining percent difference data; and
   dividing each of the digitized target pixel by the percent difference data to define output filtered data.

10. The method of claim 1 including the steps of:
    using data from said reference image as a diagnostic aid in the performance of said transmitter means.

11. A method for detecting and imaging a volume in water, the method employing an imaging lidar apparatus including laser light pulse transmitter means for generating light pulses at a selected operating wavelength and gated reflected light pulse detection means for detecting backscattered reflection from a target area to define a target signal, the generated light pulses including anomalous spatial intensity distributions derived from the laser output and further including the steps of:
    generating a reference signal which includes the anomalous spatial intensity distributions from the laser output;
    comparing the reference signal to the target signal so as to remove the anomalous spatial intensity distributions from the target signal.

12. The method of claim 11 wherein the step of obtaining the reference signal includes the steps of:
    sampling a portion of the entire cross-section of light output from said transmitter means; and
    converting said sampled portion to said reference signal.

13. The method of claim 12 including:
    using reflective pick-off means to sample said portion of light output from said transmitter means.

14. The method of claim 12 wherein said gated detection means includes a first video chip means having preselected dimensions and including:
    using second video chip means to convert said sampled portion to said reference signal, said second video chip means having preselected dimensions equal to said first video chip means.

15. The method of claim 11 wherein the step of obtaining the reference signal includes the steps of:
- receiving pulses of light reflected back from an area which is located between said detection means and said target signal to define pretarget received pulses; and
- converting said pretarget received pulses to said reference signal.

16. The method of claim 11 wherein:
- said imaging lidar apparatus is mounted on an airborne platform and said reference signal is obtained in the air above the water.

17. The method of claim 11 wherein:
- said imaging lidar apparatus is mounted on an airborne platform and said reference signal is obtained on the surface of the water.

18. An apparatus for detecting and imaging a target volume enveloped by a backscattering medium which is at least partially transmitting to light comprising:
- means for selectively generating short pulses of light using transmitter means;
- means for projecting said short pulses of light toward the backscattering medium and at a target volume enveloped by the medium;
- means for receiving said pulses of light reflected back from said target volume after a time delay corresponding to the round-trip propagation time of said light pulses to and from said target volume using receiver means;
- means for converting said received pulses of light to a video image of said target defining a target volume image;
- means for obtaining a reference image of said short pulses of light generated by said transmitter means;
- means for comparing said reference image and said target volume image; and
- means for subtracting said reference image from said target volume image.

19. The apparatus of claim 18 wherein the means for obtaining the reference image includes:
- means for sampling a portion of the entire cross-section of light output from said transmitter means; and
- means for converting said sampled portion to said reference image.

20. The apparatus of claim 19 including:
- reflective pick-off means to sample said portion of light output from said transmitter means.

21. The apparatus of claim 19 wherein said receiver means includes first video chip means having preselected dimensions and including:
- second video chip means to convert said sampled portion to said reference image, said second video chip means having preselected dimensions equal to said first video chip means.

22. The apparatus of claim 21 wherein said first and second video chip means comprise CCD arrays.

23. The apparatus of claim 18 wherein the means for obtaining the reference image includes:
- means for receiving pulses of light reflected back from a volume which is located between said receiver means and said target volume to define pre-target received pulses;
- means for converting said pre-target received pulses to said reference image.

24. The apparatus of claim 18 wherein said target image volume comprises a plurality of discrete target pixels and said reference image comprises a plurality of discrete reference pixels and including:
- means for determining the average target intensities for all target pixels;
- means for determining the average reference intensities for all reference pixels;
- means for comparing each target pixel to the average target intensities and determining a first % difference;
- means for comparing each reference pixel to the average reference intensities and determining a second % difference; and
- means for comparing the first and second differences on a pixel-by-pixel basis.

25. The apparatus of claim 18 wherein the means for obtaining the reference image includes:
- means for sampling the light return from the surface of a medium interface; and
- means for discounting the medium interface anomalies from the target volume image.

26. The apparatus of claim 18 wherein said target image volume comprises a plurality of discrete target pixels and said reference image comprises a plurality of discrete reference pixels and including:
- means for digitizing all target pixels;
- means for determining the average reference intensities for all reference pixels;
- means for determining the percent difference from the mean on an "as pixel" basis for each of the average reference intensities thereby defining percent difference data; and
- dividing the digitized target pixel by the percent difference data to define output filtered data.

27. An apparatus for detecting and imaging a volume in water, the apparatus employing an imaging lidar apparatus including laser light pulse transmitter means for generating light pulses at a selected operating wavelength and gated reflected light pulse detection means for detecting backscattered reflection from a target area to define a target signal, the generated light pulses including anomalous spatial intensity distributions derived from the laser output and further including:
- means for generating a reference signal which includes the anomalous spatial intensity distributions from the laser output; and
- means for comparing the reference signal to the target signal so as to remove the anomalous spatial intensity distributions from the target signal.

28. The apparatus of claim 27 wherein the means for obtaining the reference signal includes:
- means for sampling a portion of the entire cross-section of light output from said transmitter means; and
- means for converting said sampled portion to said reference image.

29. The apparatus of claim 28 including:
- reflective pick-off means to sample said portion of light output from said transmitter means.

30. The apparatus of claim 28 wherein said receiver means includes first video chip means having preselected dimensions and including:
- second video chip means to convert said sampled portion to said reference image, said second video chip means having preselected dimensions equal to said first video chip means.

31. The apparatus of claim 27 wherein the means for obtaining the reference image includes:
- means for receiving pulses of light reflected back from a volume which is located between said receiver means and said target volume to define pre-target received pulses; and
- means for converting said pre-target received pulses to said reference image.

* * * * *